United States Patent
Otto et al.

(10) Patent No.: US 8,235,194 B2
(45) Date of Patent: *Aug. 7, 2012

(54) MULTIPLE FRICTION MEMBER SYNCHRONIZING CLUTCH

(75) Inventors: John R. Otto, Gansevoort, NY (US); Gerald T. Scanlon, Poultney, VT (US); David C. Covey, Fairfax, VA (US); Russell R. Otto, Gansevoort, NY (US); Michael G. Holland, Saratoga Springs, NY (US)

(73) Assignee: Ottonomous Solutions LLC, Norfolk, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/734,350

(22) PCT Filed: Oct. 27, 2008

(86) PCT No.: PCT/US2008/012155
§ 371 (c)(1),
(2), (4) Date: Sep. 9, 2010

(87) PCT Pub. No.: WO2009/055057
PCT Pub. Date: Apr. 30, 2009

(65) Prior Publication Data
US 2011/0240435 A1    Oct. 6, 2011

Related U.S. Application Data

(60) Provisional application No. 61/000,630, filed on Oct. 26, 2007.

(51) Int. Cl.
*F16D 23/04* (2006.01)
(52) U.S. Cl. ............................ 192/53.1; 74/339
(58) Field of Classification Search ............... 192/53.1, 192/53.363, 53.364, 53.5, 53.3, 52.1, 52.2; 74/339
See application file for complete search history.

(56) References Cited

U.S. PATENT DOCUMENTS

| | | | | |
|---|---|---|---|---|
| 1,605,780 | A | * | 11/1926 | Ristau ..................... 192/53.5 |
| 1,681,714 | A | * | 8/1928 | Tullar ..................... 192/53.5 |
| 2010/0263980 | A1 | * | 10/2010 | Otto et al. ............... 192/53.363 |

* cited by examiner

*Primary Examiner* — Rodney Bonck
(74) *Attorney, Agent, or Firm* — Wooten & Shaddock, PLC

(57) ABSTRACT

A synchronizing clutch having a component carrier, wherein the component carrier accepts a splined shaft therethrough and interact with the splined shaft to allow transfer of rotation between the splined shaft and the component carrier while also allowing the component carrier to slide axially along the splined shaft relative to an associated friction plate. The component carrier includes a plurality of friction members pivotably coupled within walled recesses of the component carrier, such that when the component carrier is urged toward the associated friction plate, at least a portion of the contact surface of the friction members initially contacts a surface of the friction plate and, as the component carrier continues to be urged toward the associated friction plate, each friction member is rotated, such that at least a portion of the contact surface of each friction member continues to contact a surface of the friction plate.

21 Claims, 11 Drawing Sheets

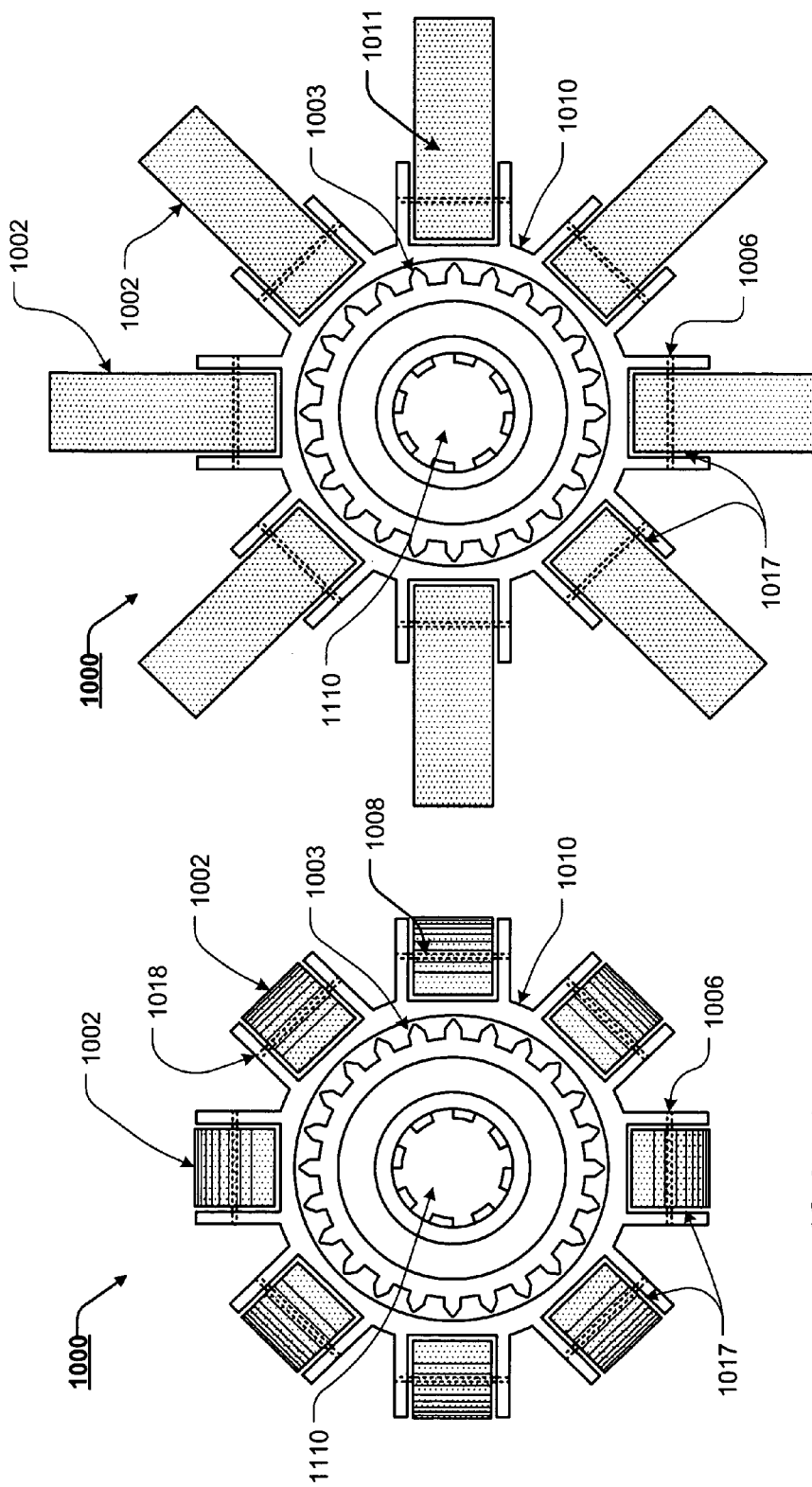

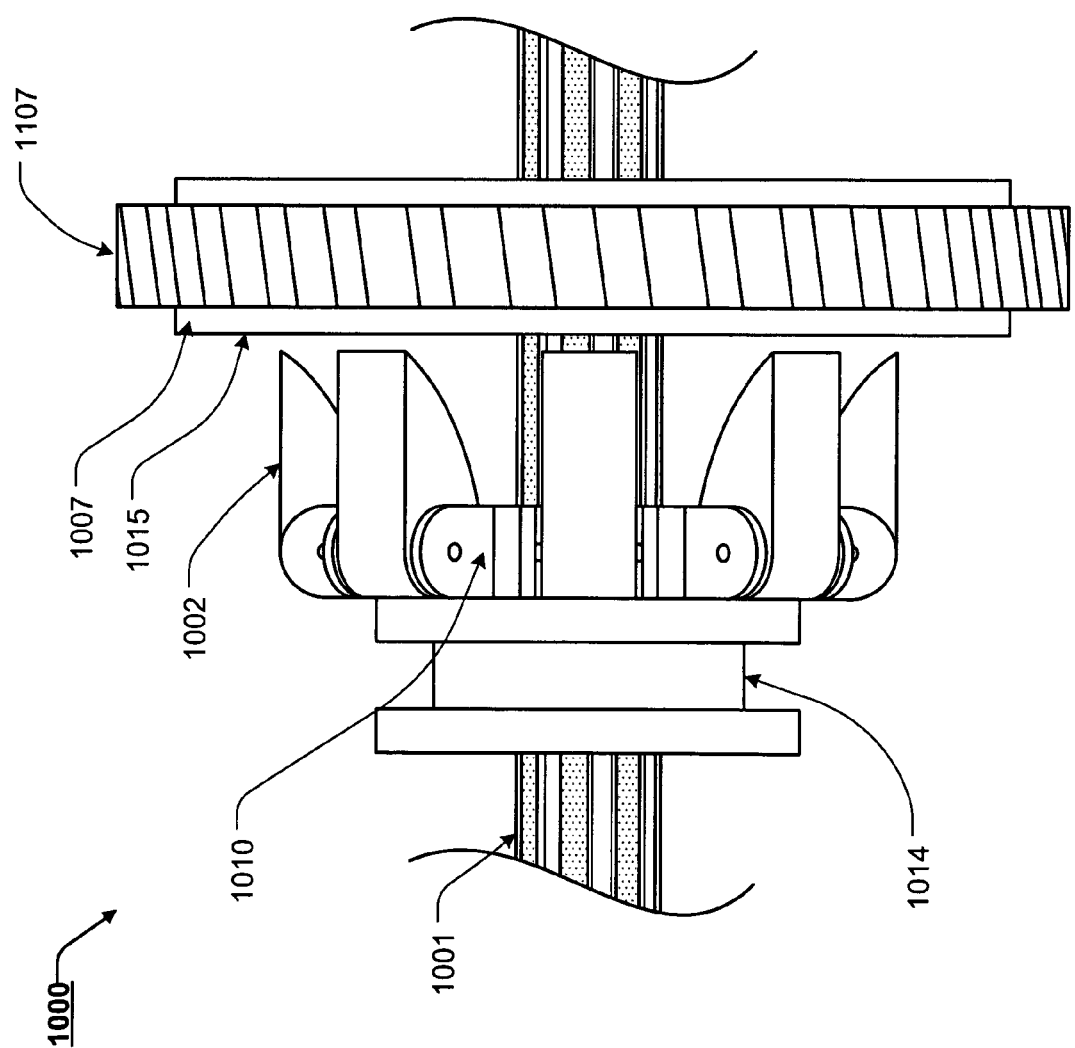

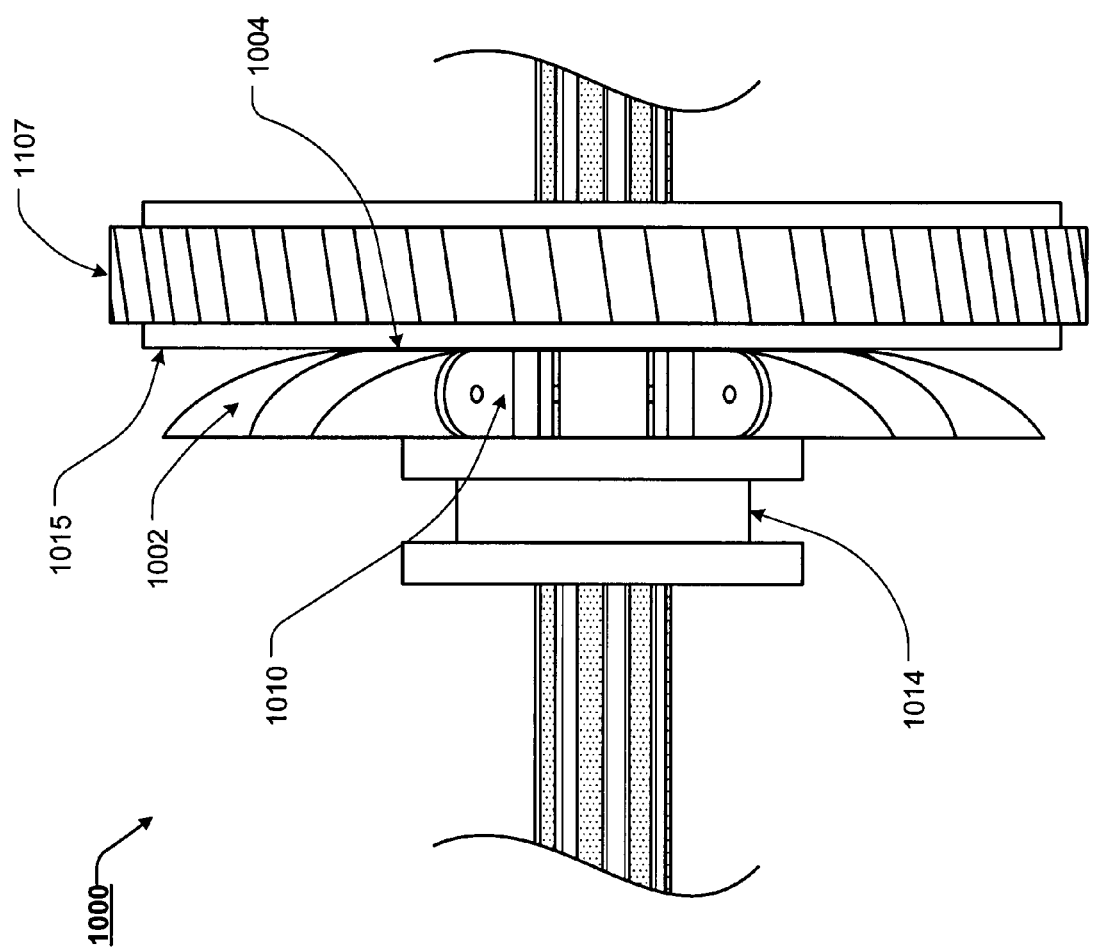

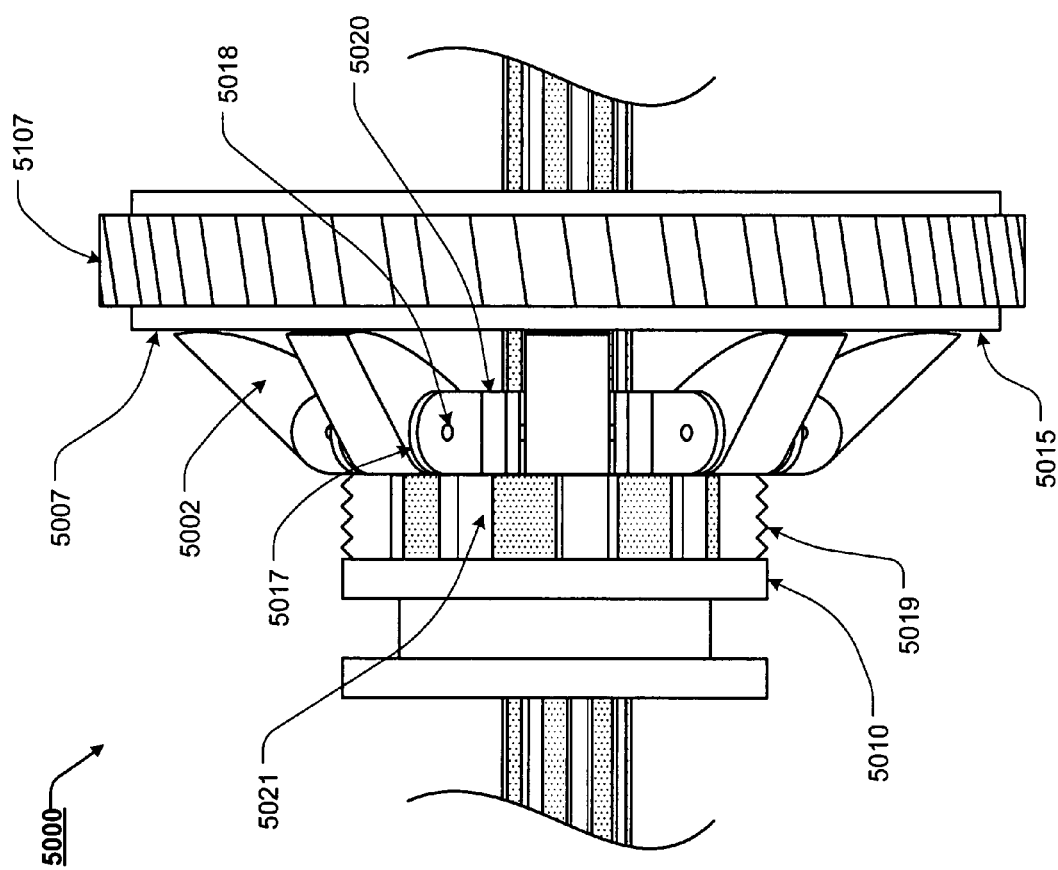

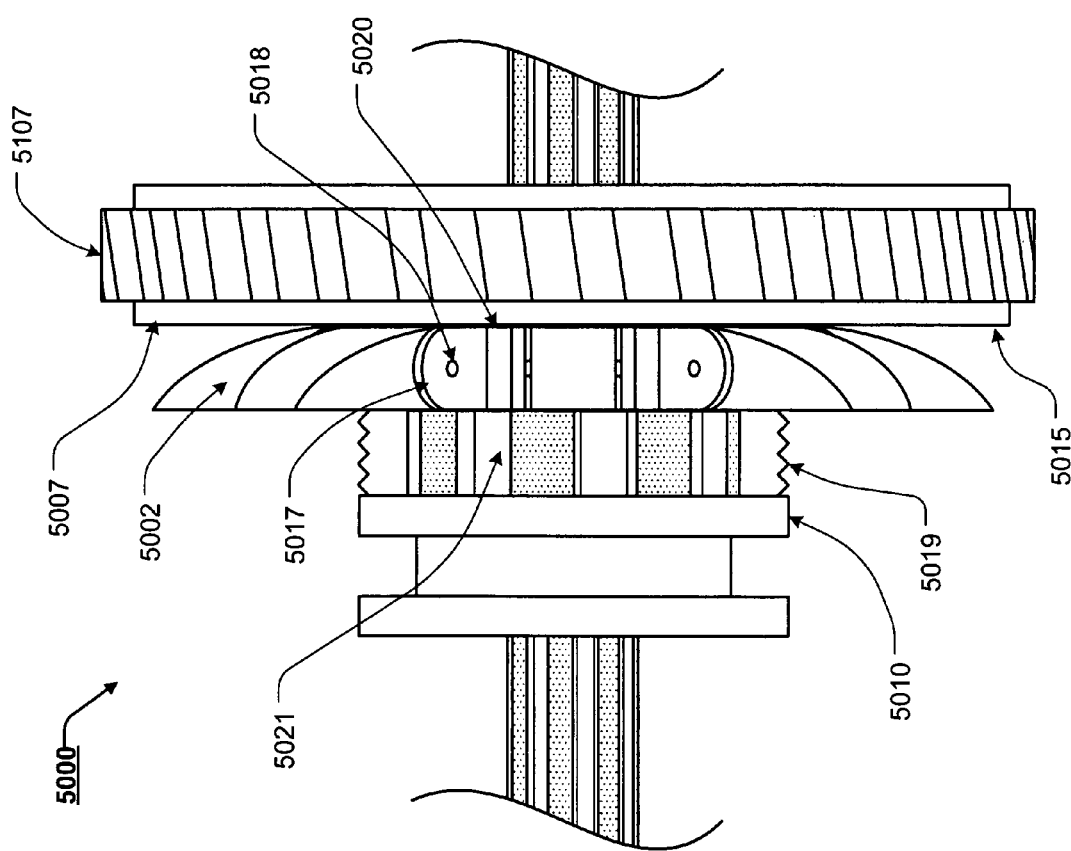

MULTIPLE FRICTION MEMBER SYNCHRONIZING CLUTCH

CROSS-REFERENCE TO RELATED APPLICATIONS

This patent application claims the benefit of U.S. patent application Ser. No. 61/000,630, filed Oct. 26, 2007, the entire disclosure of which is incorporated herein by reference.

BACKGROUND OF THE INVENTION

1. Field of the Invention

This invention relates generally to synchronizing clutches. In particular, the present invention relates to a multiple friction member synchronizing clutch.

2. Description of Related Art

In general, the components of a clutch interact negatively, or, when the rotating plates are interacting, the system has not been actuated to do so; its initial home position is with the different rotating components engaged. In these systems, when the components are actuated, they cease interaction, for example actuating the clutch pedal in a vehicle to disconnect the engine from the rest of the drive train.

In a positively engaged system, such as those found in vehicle transmissions, the effects are slightly different. In the initial position, the components are disengaged. As they are actuated, the components begin to interact, simultaneously with the synchronizer components of the transmission, as the shifter is moved from the neutral position through the gate of the desired gear. FIGS. 1A and 1B illustrate the differences between these known systems.

As illustrated in FIG. 1A, the clutch design's home position, dictated by the force mechanism used, is generally with the rotation components engaged and the user (whether it be human or computer input) actuator disengaged. Thus, as illustrated in FIG. 1B, upon user engagement of the actuator there is disengagement of rotating components; this is the negative engagement.

In a simple clutch a driving flywheel and driven clutch plate are brought into physical frictional interaction through different spring and actuation mechanisms. The actuating system rides on a bearing, which allows the clutch assembly to be linearly actuated while rotating. When actuated the clutch plate is forced into the flywheel by a pressure plate, which holds the force generating spring mechanism, usually either a diaphragm spring or spring/rocker arm system.

Another clutch variation utilizes a friction system in which a pattern of annularly mounted rotating friction members on one component interact with the friction surface other the opposing component. The force-derived friction is generated by the progressive rotational resistance of a generated torque at the connection point of each friction member. As the friction member mounted component is linearly actuated into contact with the other component's friction surface, the multiple friction member clutch system introduces frictional forces between the rotating components. These forces, as in a plate clutch, are great enough that when harnessed under controlled engagement and fed into the proper mechanical system, are capable of overcoming the inertia of a stationary vehicle or load.

In a synchronized straight drive transmission, a frictional interface between the gear of interest and the collar that selects the gears on that particular shaft is present to control the internal rotations of the transmission. When a gear is selected the clutch connection between the engine and transmission is first interrupted by the operator. The operator then selects the desired ratio. If the gear is selected from a vehicle's stationary position then no internal transmission rotations are needed to be matched and final engagement has occurred. The operator then gradually reintroduces clutch engagement to allow friction to be generated within the clutch, transmitting rotation from the engine through the transmission and causing movement of the vehicle. If the gear is selected while the vehicle is already moving, the synchronizer's role becomes more prevalent. The clutch is still initially disengaged, but when this action happens, a rotational discrepancy exists between the rotations of the input and output shafts within the transmission as a result of changing to a different gear ratio. The synchronizer uses a small amount of friction between the gear selector components and the driving components of each gear to better match their rotations so as to preserve the integrity of other components within the transmission and make driving with a manually shifted transmission easier on the operator.

The friction components are designed to be spatially efficient and therefore employ systems that can fit in a tightly toleranced transmission to keep actuation distance to a minimum. One such system employs the use of frictionally toleranced rings and/or squash springs, which compound axially together as the shifter is moved from neutral to final engagement of that gear. As the ring components combine and interact the friction between them coordinates the rotations of their respective shafts allowing for easier, more controlled final engagement, usually an interference type using dog teeth. Another engagement system utilizes a tight fit between cone-type structures, usually mounted axially on the gear selector collar, and housings on the corresponding gear. As the shifter is moved from a neutral position, the synchronizer cones are forced tightly into their housings, which create the friction that coordinates the rotations of the shaft.

Other mechanical systems have been developed to reduce the coordination required by the operator to work a straight drive transmission. The first of these is a powered actuating system that controls the clutch for the operator based on the operators other actions and how they trigger the system. In an example of this case, prior to the gear shifter being actuated the operator must reduce engine load by easing off the accelerator, which, when sensed, is when the clutch is disengaged by the actuating system. When the gear is selected, and thus actuated into engagement within the transmission, the operator begins reintroducing engine power and the clutch is automatically reengaged.

Volkswagen utilized a vacuum powered version of this system, which derived actuation force from engine intake pressures as a function of the changing engine conditions associated with selecting different gears. Citroen also had a variation of this system, which utilized a hydraulically actuated clutch controlled by the sequential gear selecting actions of the operator. Another variation of this system utilizes a button on the shifting lever, which the operator uses to control the actuation of the clutch.

These types of systems also operate very closely to a modern semi-automatic sequentially arranged transmission system in which a computer controls all of the different component, clutch, and gear selection, actuations based an basic operator input.

SUMMARY OF THE INVENTION

The synchronizing clutch is a more capable mechanical system for the synchronizing/engagement components found in the straight shaft power transmission system of a vehicle. Utilization of stronger clutch-type components allows for more controlled and higher magnitude friction forces between the spinning input and output components within the transmission to be harnessed, thereby allowing the synchronizer components of the transmission to take on the frictional and rotational load responsibilities of the engine clutch while still also selecting different ratios. The ratio selection actuator is moved from the neutral position to the engagement point of the desired gear, thus spatially controlling the frictional connection. As the components move from neutral position to final engagement the friction between the input and output components within the transmission increases, as does rotation transfer. This allows the operator to leave the engine clutch engaged but still move the vehicle or select gears solely by virtue of the position of the gear selection actuator.

Unlike the prior art systems, as illustrated, for example, in FIGS. 1A and 1B, the synchronizing clutch 1000 of the present invention, as illustrated in FIGS. 2A and 3B (illustrated using the annularly mounted multiple friction member clutch), is with the rotating components disengaged and the actuator disengaged (as illustrated in FIG. 2A), thus upon user engagement of the actuator there is engagement of the rotating components (as illustrated in FIG. 2B), this is the positive engagement.

The synchronizing clutch of the present invention is an improvement to the existing concept that positively engaged friction is used in a vehicle straight drive transmission to synchronize the rotation of the transmission lay-shaft or input shaft, with the rotation of the output shaft before transmitting rotation from the power source through the transmission via engagement of the clutch between the power source and transmission. Being that the invention is a merger of clutch type engagement assemblies and power transmission synchronizers, the background of both systems and modifications to their concepts will be explained.

In a straight drive transmission, the synchronizer components use friction to coordinate the disparate rotations within the transmission that occur between the gear shifts of an already moving vehicle in order to ease its usage as compared to an unsynchronized straight drive transmission. The problem with existing synchronizers is that their design exists only for coordinating these low rotational loads, thus requiring manipulation of the engine clutch to take on or completely disconnect the larger rotational loads present to effectively change gears and also while executing low speed or partial clutch engagement maneuvers, such as creeping in traffic, maneuvering in a parking lot or launching on an incline. This is done in order to transfer excess rotation from the engine as frictional heat energy and intentional slip losses in the clutch plate.

The synchronizing clutch of the present invention replaces the overall synchronizer system, motions, actions and responsibilities with more capable clutch-type components to carry part, if not all, of the potential load from an engine clutch; this allows the shifting system within the transmission to both change gear ratios and control the frictional power connection between the engine and transmission.

The synchronizing clutch of the present invention combines the frictional synchronization characteristics of the aforementioned transmission synchronizer designs with the frictional drive and load bearing characteristics of clutch-type assemblies; this allows the operator to move the vehicle using the position of the gear shifting actuator without the requirement of operating the engine clutch, eliminating the tedious, multi-limbed coordinated movements involved in low speed maneuvers, such as creeping in traffic, maneuvering in a parking lot or launching the vehicle from a stopped position on any surface. It also saves time otherwise lost due to long or highly coordinated gear changes.

The synchronizing clutch of the present invention, depending on the embodiment of clutch mechanism used, can utilize both fiction-based and interference-based final engagement types. If an interference engagement type is employed, then the components need to be modified with slider pieces to prevent premature engagement of the dog teeth.

The addition of a bearing and separating connection piece between the driven plate and the actual ratio component (gear or sprocket) through the wall of the transmission allows the individual wear-designed synchronizing clutch systems to be moved out of the fluid-filled transmission ratio system and into a compartment or partition while still riding along the same shaft. This separation of the transmission ratio systems and the frictional selector system allows for better control of inevitable material particulates from the friction system, as well as better access to said system should the wear components need replacing.

The synchronizing clutch engagement system of the present invention does not require an additional, different power or logic system to work properly, only a more compatible/capable variation of the existing required linear actuation/engagement/management/selector system within the transmission. This allows for increased versatility of the mechanism because it can also be piggybacked and/or coordinated into or through another system. An example this would be utilization of the hydraulic/pneumatic systems found in the existing brake lines, or another such force actuating device. The invention can also be tied into the open loop system and data processing of other systems such as vehicle traction control.

With all vehicle movement related rotational engagements taken care of by the shifter movement, the clutch pedal is now available to take on other actuation responsibilities.

The synchronizing clutch engagement system of the present invention does not impede the basic operations of a synchronized straight drive transmission. An engine clutch may still be present in the vehicle in order to afford the operator the choice of shifting/engagement method; i.e. the existing clutch disengagement-shift-reengage method vs. the comprehensive nature of the synchronizing clutch selection/engagement. During a clutch disengagement-shift-reengage situation the synchronizing clutch system acts solely as a more efficient low load synchronizer.

Accordingly, this invention provides a multiple friction member synchronizing clutch.

This invention separately provides a way to frictionally match and connect the rotational velocities and forces of different rotating components in a revolving system.

This invention separately provides a multiple friction member synchronizing clutch having annularly patterned friction members around one component.

This invention separately provides a multiple friction member synchronizing clutch having a frictional surface for the friction members to act upon.

This invention separately provides a multiple friction member synchronizing clutch that does not require a special component system to actuate the rotating components and may optionally be run by any linearly actuating system that is strong enough to overcome the forces needed to couple the components for the rotational load situation.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 3A illustrates a front elevation view of a first exemplary embodiment of a synchronizing clutch according to this invention, wherein the friction members are illustrated in a neutral position;

FIG. 3B illustrates a front elevation view of a first exemplary embodiment of a synchronizing clutch according to this invention, wherein the friction members are illustrated in a final engagement position;

FIG. 4A illustrates a side elevation view of a first exemplary embodiment of a synchronizing clutch according to this invention, wherein the synchronizing clutch component carrier is illustrated in a neutral position;

FIG. 4C illustrates a side elevation view of a first exemplary embodiment of a synchronizing clutch according to this invention, wherein the synchronizing clutch component carrier is illustrated in a final engagement position;

FIG. 5B illustrates a side elevation view of an exemplary embodiment of a synchronizing clutch according to this invention, wherein the exemplary synchronizing clutch component carrier is illustrated in a first intermediate position;

FIG. 5C illustrates a side elevation view of an exemplary embodiment of a synchronizing clutch according to this invention, wherein the exemplary synchronizing clutch component carrier is illustrated in a second intermediate position;

DETAILED DESCRIPTION OF EXEMPLARY EMBODIMENTS

For simplicity and clarification, the design factors and operating principles of the synchronizing clutch according to this invention are explained with reference to various exemplary embodiments of a synchronizing clutch according to this invention. The basic explanation of the design factors and operating principles of the synchronizing clutch is applicable for the understanding, design, and operation of the synchronizing clutch of this invention.

It should be appreciated that the terms "clutch" and "synchronizing clutch" are used for basic explanation and understanding of the operation of the systems, methods, and apparatuses of this invention. Therefore, the terms "clutch" and "synchronizing clutch" are not to be construed as limiting the systems, methods, and apparatuses of this invention.

It should also be understood that the absence of specific potential hardware and general assembly items such as bolts, washers, nuts, balancing pieces, spacers, bearings etc. is intentional and the exact use of such specific components in conjunction with the invention is a design choice to be determined by the designing or manufacturing entity.

Considering the operation, manufacture, and design of straight drive transmissions, the synchronizing clutch, and its various embodiments, can be utilized in two basic forms: the collar-force synchronizing clutch, in which the force mechanism is located on the actuated collar, and the gear-force synchronizing clutch, in which the force mechanism is located on the stationary gear component. When the synchronizing clutch's force-inducing components are emphasized on the gear selection collar with the said collar linearly actuated the force-loaded friction materials on the collar press onto a friction medium on the gear of interest, instigating rotation (with moderate slippage) before the final engagement coupling components meet, transferring all rotation from the engine to the wheels.

When the synchronizing clutch is emphasized on the gear of interest the linearly stationary force-loaded friction components instead press onto a friction medium mounted on the gear selection collar, once again instigating rotation (with moderate slippage) before the final drive coupling components meet, transferring all rotation from the engine, through the transmission, to the wheels.

The descriptions of each synchronizing clutch clutch-type assembly, force-inducing pieces, and friction-generating components will vary because of the plethora of clutch designs available. Regardless of the actual clutch engagement system used (diaphragm spring, spring and rocker arm, compression plate, squash spring plate, annularly mounted friction member clutch, etc.) the presence and use of linear actuation controlled friction within the transmission is still a universal facet of the invention.

Figure 1A:
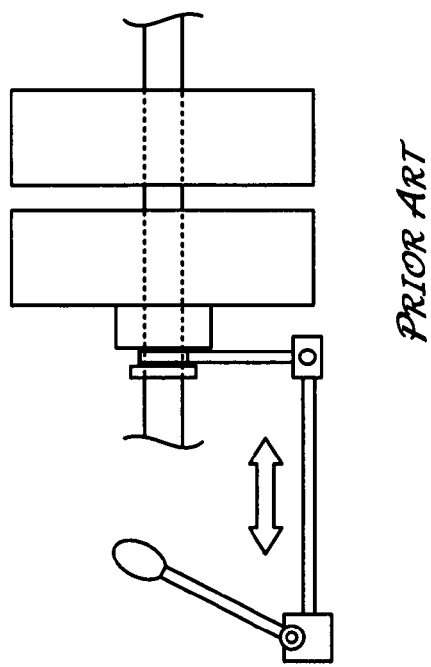
FIG. 1A illustrates a block diagram of certain prior art clutch system components, wherein the clutch is illustrated with the rotation components engaged and the user actuator disengaged.
Figure 1B:
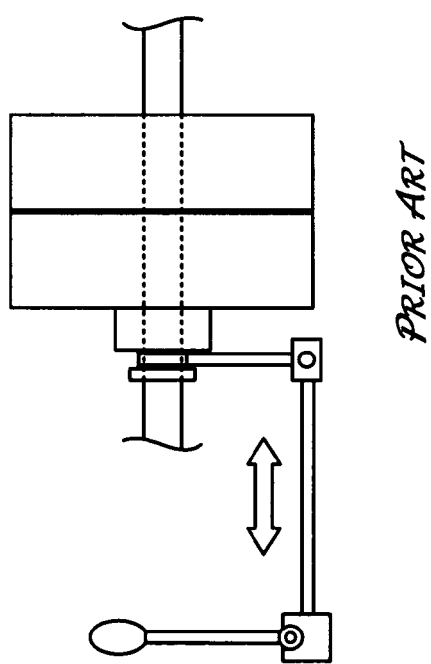
FIG. 1B illustrates a block diagram of certain prior art clutch system components, wherein the clutch is illustrated with the user actuator engaged and the rotation components disengaged.
Figure 2A:
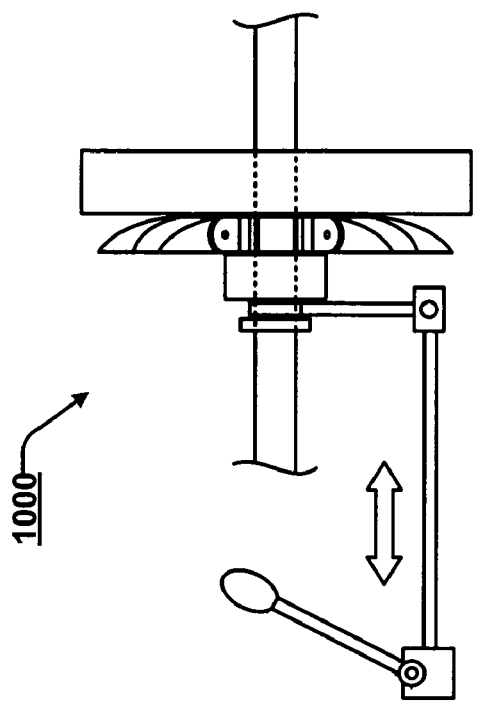
FIG. 2A illustrates a block diagram of a first exemplary embodiment of a synchronizing clutch according to this invention, wherein the clutch is illustrated with the rotating components disengaged and the actuator disengaged.
Figure 2B:
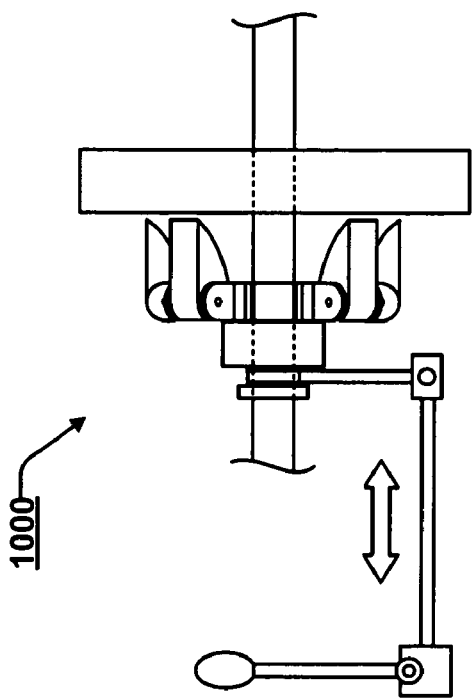
FIG. 2B illustrates a block diagram of a first exemplary embodiment of a synchronizing clutch according to this invention, wherein the clutch is illustrated with the actuator engaged and the rotating components engaged.
Figure 4B:
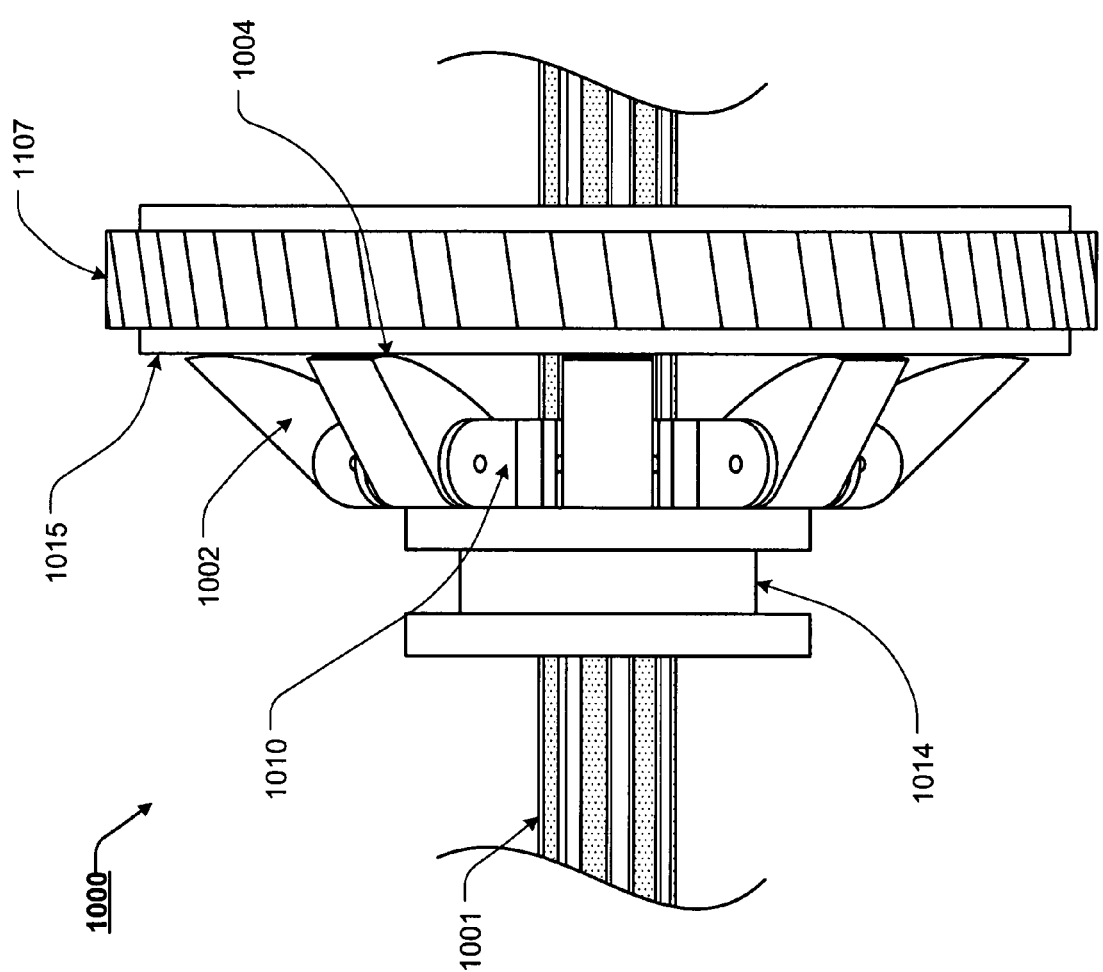
FIG. 4B illustrates a side elevation view of a first exemplary embodiment of a synchronizing clutch according to this invention, wherein the synchronizing clutch component carrier is illustrated in an intermediate position.

Turning now to the drawing figures, FIGS. 3A-3B illustrate a first exemplary embodiment of a synchronizing clutch 1000 according to this invention, wherein the friction members 1002 of the synchronizing clutch 1000 is illustrated in a neutral position and in a final engagement position, respectively. FIGS. 4A-4C illustrate the basic engagement progression of the synchronizing clutch 1000, wherein the synchronizing clutch component carrier 1010 is illustrated in a neutral position, an intermediate position, and a final engagement position, respectively.

As illustrated in FIGS. 3A-4C, the synchronizing clutch 1000 comprises at least some of a component carrier 1010 and a plurality of friction members 1002, pivotably coupled, via rotation pins 1006, and radially extending from corresponding wall recesses 1017 of the component carrier 1010.

The component carrier 1010 includes a central aperture 1110 formed therethrough. The central aperture 1110 is formed such that the component carrier 1010 is able to accept a splined shaft 1001 therethrough and interact with the splined shaft 1001.

The interaction between friction member component carrier 1010 and splined shaft 1001 remains true to the spline/key design of the splined shaft 1001, allowing the transfer of rotation between splined shaft 1001 to friction member component carrier 1010 while also allowing component carrier 1010 to slide axially along splined shaft 1001 as the component carrier 1010 and 1007 are brought into frictional and rotational interaction.

The component carrier 1010 of the synchronizing clutch contains a plurality of walled recesses 1017 (cut outs, or other such structures for friction members to reside) around the outer rim. A mounting aperture 1018 is formed through each walled recesses 1017 within component carrier 1010 so as to receive a rotation axis/pin 1006. Mounted on each rotation pin 1006 is a friction member 1002 so as to extend radially from the component carrier 1010 within walled recesses 1017.

Proximate a base of each friction member 1002 is a mounting aperture 1008 with an optional clearance fit tolerance, or some other optional rotating bearing, to allow pivoting of each friction member around their respective rotation pins (however it should be noted that the clearance fit or bearing may optionally be between mounting aperture 1008 and rotation pin 1006). A torque, will force the friction member 1002 into interaction of its contact surface 1011 with the friction surface 1015 of the opposing friction plate 1007.

The surface 1015 of friction plate 1007 may optionally be reinforced, or contain a separate plate, with a friction material formed of, for example, a resin-type material, hardened metal or ceramic material.

FIG. 4A illustrates synchronizing clutch mounted component carrier 1010 in a neutral position prior to the first instance of frictional interaction between friction members 1002 and friction surface 1015 of opposing friction plate 1007.

During operation, as the actuating fork/arm (not illustrated), which would ride, possibly with a bearing, in groove 1014, moves the component carrier 1010 axially along splined shaft 1001 from the neutral position (as illustrated in FIG. 4A) towards the opposing friction plate 1007 and its friction surface 1015, the contact surfaces 1011 of the friction members 1002 begin to make contact with the friction surface 1015 (as illustrated in FIG. 4B). This initiates the frictional gripping forces, which begin rotating the component carrier 1010 and friction plate 1007 together.

FIG. 4B illustrates the component carrier 1010 after it has been axially actuated towards contact with opposing friction plate 1007 at an intermediate point in the carrier's 1010 travel. Note that the interaction of the curved contact surface 1011 between friction members 1002 and friction surface 1015 at tangent engagement surface 1004. A torque generated around rotation pin 1006 in conjunction with the lever arm created between the rotation pin 1006 and engagement surface 1004 creates the engagement friction. This is the friction that will synchronize the differing rotations between component carrier 1010 and friction plate 1007.

FIG. 4B illustrates the synchronizing clutch at an intermediate point in its axial travel prior to final engagement of dog teeth 1003 (hidden by clutch mounted collar 1010). It should be understood that dog tooth engagement is optional; compounded axial force to induce higher frictional connection between collar 1010 and friction surface 1015 of gear 1107 is also possible. Also, note the interaction between friction member's 1002 friction surface 1011 and friction plate 1015 of gear 1107 at tangent point 1004.

It should be appreciated that dog tooth engagement is optional; compounded axial force to induce more frictional connection between the collar's 1010 friction plate 1007 and friction surface 1015 of gear 1107 is also possible. Because the collar is linearly actuated and because of the particular force mechanism described by the individual clutch literature, pressure clutch mounted collar 1010 presses into friction surface 1015, instigating the frictional forces, which will coordinate the rotations of the two components.

As the component carrier 1010 continues axially along splined shaft 1001 towards friction plate 1007, the friction members 1002 rotate outwardly about rotation pins 1006. Between the neutral position and the point at which the system is fully engaged, each friction member 1002 will rotate about their rotation pin 1006 and adjust their frictional engagement surface 1004 on the friction surface 1015 based on the amount of travel accomplished by the actuating mechanism and thus the travel of component carrier 1010. When the system is fully engaged (as illustrated in FIG. 4C), the friction members 1002 reach a point in their rotation where they are out of the way of both the actuation member (represented by groove 1014), and the final engagement components (either engagement of the dog teeth 1003 or locking of a friction medium). FIG. 4C illustrates the component carrier 1010 at its final engagement between component carrier 1010 and opposing friction plate 1007 with the friction members 1002 rotated into their final position.

In FIG. 4C the collar 1010 has actuated fully, clutch mounted collar 1010 has frictionally engaged surface 1015 of gear 1107, synchronizing the rotations of collar 1010, shaft 1001, and gear 1107. Collar 1010 has also actuated far enough to engage the hidden dog teeth 1003 with the corresponding receiving point 1033 on gear 1107. In this position, the friction members 1002 have fully rotated and obstruct neither groove 1014 for the gear selector fork (not illustrated) nor the engagement of dog teeth 1003 with friction plate 1015.

FIGS. 5A-5D illustrate an exemplary embodiment of a synchronizing clutch 5000 according to this invention. It should be appreciated that the elements of the synchronizing clutch 5000 operate similarly to corresponding elements of the synchronizing clutch 1000.

Figure 5A:
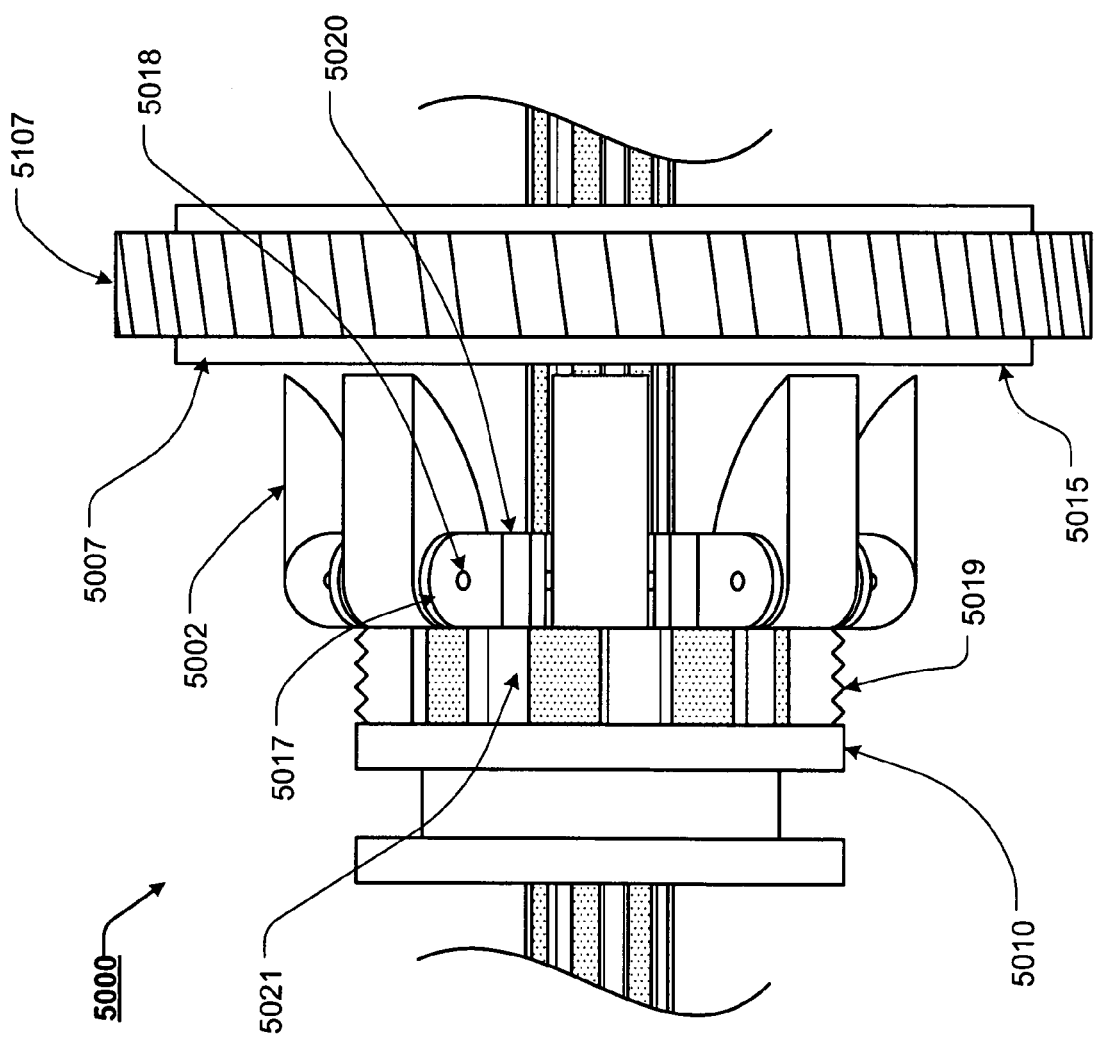
FIG. 5A illustrates a side elevation view of an exemplary embodiment of a synchronizing clutch according to this invention, wherein the exemplary synchronizing clutch component carrier is illustrated in a neutral position.
Figure 5D:
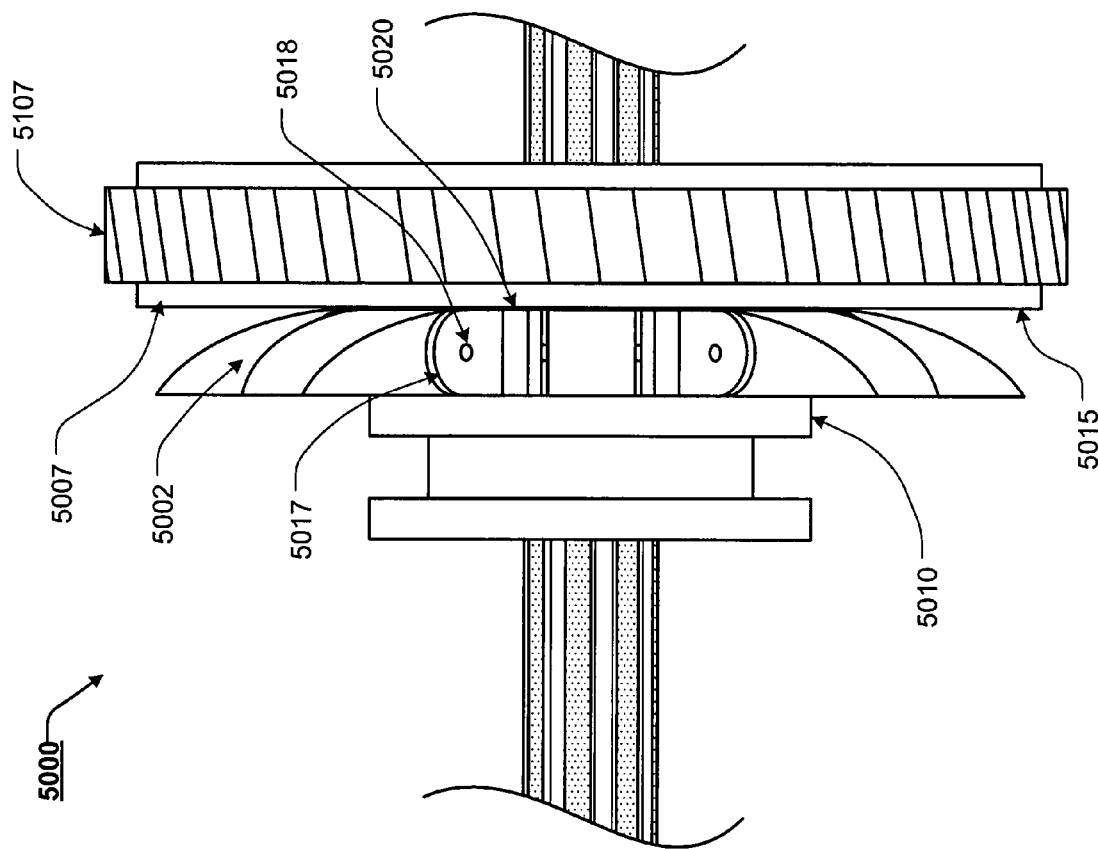
FIG. 5D illustrates a side elevation view of an exemplary embodiment of a synchronizing clutch according to this invention, wherein the exemplary synchronizing clutch component carrier is illustrated in a final engagement position.

As illustrated in FIGS. 5A-5D, a sliding outer component carrier 5020 containing friction member walled recesses 5017, mounting apertures 5018, rotation pins 5006, and friction members 5002 (as described herein with respect to FIG. 5). Outer component carrier 5020 connects in a spline fashion 5021 to inner collar 5010 allowing outer component carrier 5020 to slide independently of the inner collar 5010, yet rotate together. Outer component carrier 5020 is pre-loaded in an initial position by compression springs 5019 in which the dog teeth (hidden) of the inner collar 5010 will be covered as to not engage prematurely. After friction members 5002 complete a full rotation as and the friction has developed, as described with reference to FIGS. 4A-4C, inner collar 5010 moves under outer component carrier 5020 exposing dog teeth and allowing them to ultimately engage with opposing friction plate 5007 via dog tooth engagement apertures. Outer component carrier 5020 also provides a plane in which an additional friction medium may be placed, allowing for more complete coupling of the collar assembly 5010/5020 and opposing friction plate 5007.

More specifically, FIG. 5A illustrates the inner/outer collar assembly 5010/5020 in an unengaged position. The position of the friction members 5002 prior to engagement with the friction surface 5015 of friction plate 5007 should be noted.

As illustrated in FIG. 5B, the assembly 5010/5020 has axially advanced towards friction plate 5007. The friction members 5002 are in an intermediate position of their rotation. Note that any dog teeth are still covered, preventing potential interaction, and compression springs 5019 are still in initial position.

FIG. 5C illustrates the friction members after they have fully rotated. Once again, note the spring position and the fact that the dog teeth are still covered by the component carrier.

FIG. 5D illustrates the friction members fully rotated and collar 5010 fully traversed under component carrier 5020. Compression springs 5019 are compressed and thus connection between dog teeth and receivers is complete.

Being that the synchronizing clutch system works using wear parts, like the engine clutch, periodically some components of the synchronizing clutch must be repaired or replaced. However, by nature, the components of a transmission maintain tight tolerances and must remain contaminant-free. To resolve this issue a separate compartment in the transmission may optionally be created for the synchronizing clutch to reduce interaction between the environment, and the other components in the transmission while the components of the synchronizing clutch system are being maintained. A more specific variation of this principle is air cooling the collar assembly by moving the travel and friction engagement of the collar bearing synchronizing clutch assembly outside of the fluid filled transmission compartment.

Figure 6:
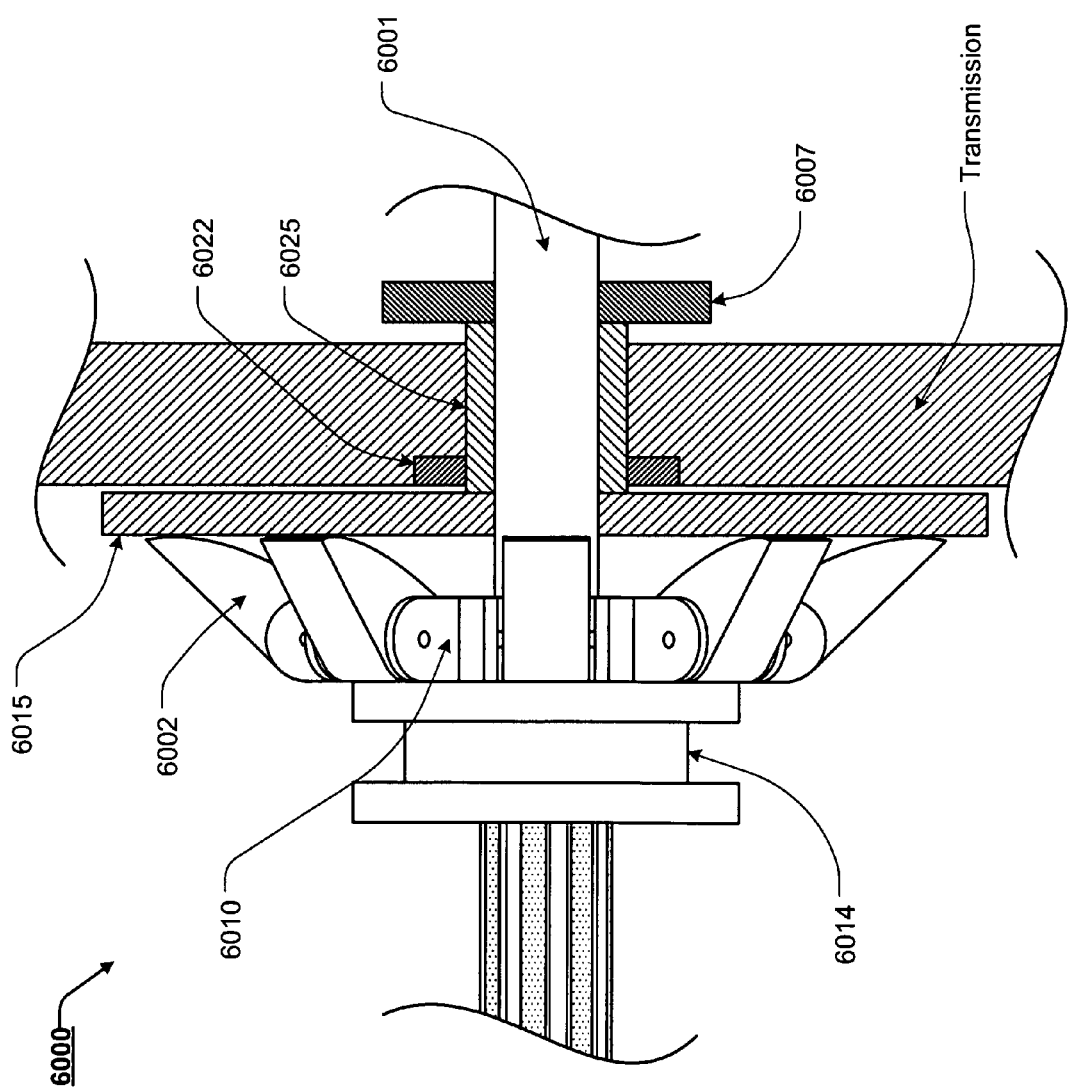
FIG. 6 illustrates a side elevation view of an exemplary embodiment of a synchronizing clutch according to this invention, wherein the exemplary synchronizing clutch component carrier is illustrated in an intermediate position.

FIG. 6 illustrates an exemplary embodiment of the synchronizing clutch 6000 interacting with gear 6007 using separator section 6025 to extend friction surface 6015 outside of the transmission ease. It should be appreciated that the elements of the synchronizing clutch 6000 operate similarly to corresponding elements of the synchronizing clutch 1000.

Friction surface 6015 and friction members 6002 then interact in the same fashion outside of the transmission as they would inside. Separator section 6025 physically couples friction surface 6015 outside the transmission, to the spinning gear 6007 inside the transmission ease. Separator section is free to spin around the non-splined portion of shaft 6001. Separator section may be just a simple bearing structure or have cross sectional axial geometry that restricts movement along its axis, i.e., preventing the section from traversing into the transmission case, or in along the spline shaft 6001 towards the collar 6010. The separator section will be accessible by means of a removable plate 6022 on the outer surface of the transmission case. Previously stated geometry will allow for removal of separator section while still restraining axial movement.

While this invention has been described in conjunction with the exemplary embodiments outlined above, it is evident that many alternatives, modifications, and variations will be apparent to those skilled in the art. For example, this invention may optionally be used to not only synchronize rotations, but stop them as well, introducing uses within other facets of the realm of motion control. Any and all such adaptations and modifications should and are intended to be comprehended within the meaning and range of equivalents of the disclosed exemplary embodiments. It should also be appreciated that the multiple friction member synchronizing clutch has several important features, each with their own series of variations depending on the rotational/load situation and manufacturer's choice of components/materials/specific geometry.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A synchronizing clutch, comprising:
    a component carrier, wherein the component carrier comprises a plurality of walled recesses extending radially from an outer perimeter of the component carrier, wherein the component carrier includes a central aperture formed therethrough, wherein the central aperture is formed so as to accept a splined shaft therethrough and interact with the splined shaft, and wherein interaction between the component carrier and the splined shaft allows transfer of rotation between the splined shaft and the component carrier while also allowing the component carrier to slide axially along the splined shaft between a normal position and an engaged position relative to an associated friction plate;
    a plurality of friction members, wherein each friction member includes a contact surface, and wherein each friction member is pivotably coupled, via a rotation pin, within a respective one of said plurality of walled recesses of the component carrier, and wherein each friction member is pivotable between a normal position and an engaged position, such that when the component carrier is urged toward the associated friction plate, at least a portion of the contact surface of the friction members initially contacts a surface of the friction plate and, as the component carrier continues to be urged toward the associated friction plate, each friction member is rotated, about the friction member's associated rotation pin, such that at least a portion of the contact surface of each friction member continues to contact a surface of the friction plate; and
    at least one final engagement component associated with the component carrier, wherein the at least one final engagement component of the component carrier is capable of interacting with a final engagement component of a friction plate when the component carrier is in the engaged position and disengaging from the final engagement component of the friction plate when the component carrier is in the normal position;
    wherein the synchronizing clutch is coupled to a transmission having a transmission output such that when the component carrier is in the engaged position, sufficient frictional engagement is achieved between the at least one final engagement component and the friction plate to at least initiate rotation of the transmission output.

2. The synchronizing clutch of claim 1, wherein the at least one final engagement component associated with the component carrier comprises dog teeth.

3. The synchronizing clutch of claim 1, further comprising at least one groove associated with the component carrier for accepting an actuating fork for manipulating the component carrier to slide axially along the splined shaft from the normal position to the engaged position.

4. The synchronizing clutch of claim 1, wherein the plurality of walled recesses comprise cut outs extending inwardly from the outer perimeter of the component carrier.

5. The synchronizing clutch of claim 1, wherein the surface of the friction plate comprises a separate, reinforced plate.

6. The synchronizing clutch of claim 1, wherein the synchronizing clutch produces linear actuation controlled friction within the transmission.

7. The synchronizing clutch of claim 1, wherein each friction member includes a curved contact surface.

8. The synchronizing clutch of claim 1, wherein the transmission is a vehicle transmission having a vehicle transmission output such that when the component carrier is in the engaged position, sufficient frictional engagement is achieved between the at least one final engagement component and the friction plate to rotate the vehicle transmission output.

9. The synchronizing clutch of claim 1, wherein the synchronizing clutch is coupled to an engine clutch.

10. The synchronizing clutch of claim 1, wherein the synchronizing clutch is utilized with various gear ratios in a transmission.

11. A synchronizing clutch, comprising:
- an externally splined inner collar wherein the inner collar includes a central aperture formed therethrough, wherein the central aperture is formed so as to accept a splined shaft therethrough and interact with the splined shaft, and wherein interaction between the inner collar and the splined shaft allows transfer of rotation between the splined shaft and the inner collar while also allowing the inner collar to slide axially along the splined shaft between a normal position and an engaged position relative to an associated friction plate;
- an outer component carrier, wherein the outer component carrier comprises a plurality of walled recesses extending radially from an outer perimeter of the outer component carrier; wherein the outer component carrier includes a central aperture formed therethrough, wherein the central aperture is formed so as to accept the externally splined inner collar therethrough and interact with the splined inner collar, and wherein interaction between the outer component carrier and the splined inner collar allows transfer of rotation between the splined inner collar and the outer component carrier while also allowing the outer component carrier to slide axially along the splined inner collar between a normal position and an engaged position relative to the associated friction plate;
- a plurality of friction members, wherein each friction member includes a contact surface, and wherein each friction member is pivotably coupled, via a rotation pin, within a respective one of said plurality of walled recesses of the outer component carrier, and wherein each friction member is pivotable between a normal position and an engaged position, such that when the outer component carrier is urged toward the associated friction plate, at least a portion of the contact surface of the friction members initially contacts a surface of the friction plate and, as the outer component carrier continues to be urged toward the associated friction plate, each friction member is rotated, about the friction member's associated rotation pin, such that at least a portion of the contact surface of each friction member continues to contact a surface of the friction plate; and
- at least one final engagement component associated with the inner collar wherein the at least one final engagement component of the inner collar is capable of interacting with a final engagement component of a friction plate when the inner collar is in the engaged position and disengaging from the final engagement component of the friction plate when the inner collar is in the normal position;
- wherein the synchronizing clutch is coupled to a transmission having a transmission output such that when the component carrier is in the engaged position, sufficient frictional engagement is achieved between the at least one final engagement component and the friction plate to at least initiate rotation of the transmission output.

12. The synchronizing clutch of claim 11, wherein the inner collar is biased to the normal position relative to the outer component carrier.

13. The synchronizing clutch of claim 11, wherein the transmission is a vehicle transmission having a vehicle transmission output such that when the component carrier is in the engaged position, sufficient frictional engagement is achieved between the at least one final engagement component and the friction plate to rotate the vehicle transmission output.

14. The synchronizing clutch of claim 11, wherein the synchronizing clutch is coupled to an engine clutch.

15. The synchronizing clutch of claim 11, wherein the synchronizing clutch is utilized with various gear ratios in a transmission.

16. The synchronizing clutch of claim 11, further comprising at least one groove associated with the component carrier for accepting an actuating fork for manipulating the component carrier to slide axially along the splined shaft from the normal position to the engaged position.

17. The synchronizing clutch of claim 11, wherein the surface of the friction plate is reinforced.

18. The synchronizing clutch of claim 11, wherein the surface of the friction plate comprises a separate plate.

19. The synchronizing clutch of claim 11, wherein each friction member includes a curved contact surface.

20. The synchronizing clutch of claim 11, wherein the at least one final engagement component associated with the component carrier comprises dog teeth.

21. The synchronizing clutch of claim 11, wherein the synchronizing clutch produces linear actuation controlled friction within the transmission.

* * * * *

UNITED STATES PATENT AND TRADEMARK OFFICE
CERTIFICATE OF CORRECTION

| | | |
|---|---|---|
| PATENT NO. | : 8,235,194 B2 | Page 1 of 1 |
| APPLICATION NO. | : 12/734350 | |
| DATED | : August 7, 2012 | |
| INVENTOR(S) | : John R. Otto et al. | |

It is certified that error appears in the above-identified patent and that said Letters Patent is hereby corrected as shown below:

Col. 2, Line 59, delete "an" and insert --on--.

Signed and Sealed this
Ninth Day of October, 2012

David J. Kappos
*Director of the United States Patent and Trademark Office*